United States Patent
Takaba

(10) Patent No.: US 7,545,709 B2
(45) Date of Patent: Jun. 9, 2009

(54) OPTICAL DISK APPARATUS HAVING SERVO PARAMETER SETTING UNIT

(75) Inventor: Sadayuki Takaba, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 765 days.

(21) Appl. No.: 11/265,511

(22) Filed: Nov. 3, 2005

(65) Prior Publication Data

US 2006/0092782 A1    May 4, 2006

(30) Foreign Application Priority Data

Nov. 4, 2004    (JP) ............................ P2004-321051

(51) Int. Cl.
*G11B 7/09* (2006.01)
(52) U.S. Cl. .................. 369/44.29; 369/44.36
(58) Field of Classification Search ............... None
See application file for complete search history.

(56) References Cited

U.S. PATENT DOCUMENTS

| | | | | |
|---|---|---|---|---|
| 5,005,163 | A * | 4/1991 | Yamamoto et al. | 369/44.36 |
| 6,137,758 | A * | 10/2000 | Nemoto | 369/44.29 |
| 6,335,909 | B1 * | 1/2002 | Hashimoto | 369/44.29 |
| 6,487,149 | B1 * | 11/2002 | Yokoi et al. | 369/47.25 |
| 6,603,726 | B1 * | 8/2003 | Yoshida et al. | 369/124.01 |
| 7,151,723 | B2 * | 12/2006 | Takasaka et al. | 369/44.35 |
| 2002/0009035 | A1 * | 1/2002 | Tonami | 369/59.22 |
| 2004/0071054 | A1 * | 4/2004 | Watanabe et al. | 369/44.29 |
| 2007/0058502 | A1 * | 3/2007 | Huang et al. | 369/44.35 |

FOREIGN PATENT DOCUMENTS

| | | | |
|---|---|---|---|
| JP | 01050247 A | * | 2/1989 |
| JP | 05159318 A | * | 6/1993 |
| JP | A-2001-093165 | | 4/2001 |
| JP | A-2001-266371 | | 9/2001 |
| JP | A-2002-260250 | | 9/2002 |
| JP | A-2003-242660 | | 8/2003 |

* cited by examiner

*Primary Examiner*—Andrea L Wellington
*Assistant Examiner*—Nathan Danielsen
(74) *Attorney, Agent, or Firm*—Morgan, Lewis & Bockius LLP

(57) ABSTRACT

An optical disk apparatus decides reading time parameters to be set in a tracking error signal generation part at the reading time by applying a laser light of record power to an optical disk. A state where the laser light of record power is applied to the optical disk is artificially produced based on the reading time parameters decided herein. In the state, the recording time parameters to be set in the tracking error signal generation part at the recording time are decided.

7 Claims, 6 Drawing Sheets

FIG. 3
FOCUS PARAMETERS

|  | 22a | 22b | 23a | 23b | 24a | 24b | 25a | 25b | 27 |
|---|---|---|---|---|---|---|---|---|---|
| RECORDED AREA | A1 | A2 | A3 | A4 | A5 | A6 | A7 | A8 | A9 |
| UNRECORDED AREA | A1 | A2 | A3 | A4 | A5' | A6' | A7' | A8' | A9' |
| RECORDING TIME | A1 | A2 | A3 | A4 | A5" | A6" | A7" | A8" | A9" |

FIG. 4
TRACKING PARAMETERS

|  | 32a | 32b | 33a | 33b | 34a | 34b | 35a | 35b | 37 |
|---|---|---|---|---|---|---|---|---|---|
| RECORDED AREA | B1 | B2 | B3 | B4 | B5 | B6 | B7 | B8 | B9 |
| UNRECORDED AREA | B1 | B2 | B3 | B4 | B5' | B6' | B7' | B8' | B9' |
| RECORDING TIME | B1 | B2 | B3 | B4 | B5" | B6" | B7" | B8" | B9" |

OPTICAL DISK APPARATUS HAVING SERVO PARAMETER SETTING UNIT

BACKGROUND OF THE INVENTION

1. Field of the Invention

The present invention relates to an optical disk apparatus that reads data from an optical disk such as DVD or CD, and records data in the optical disk.

2. Description of the Related Art

The optical disk apparatus that can make the readout of data recorded in the optical disks such as DVD and CD and the recording of data has been generally widespread.

The optical disk apparatus applies the laser light of read power to the optical disk set on the main body, and reads the data recorded in this optical disk, as well known.

Also, it applies the laser light of record power that is greater than the read power, and records data in the optical disk. Further, the optical disk apparatus performs a tracking servo control for aligning the position where the laser light is applied to the center of the track of the optical disk of the position at the time of readout and recording and a focus servo control for aligning the focused position of laser light on a record face of the optical disk. The tracking servo control is servo control that uses a tracking error signal indicating a deflection between the position where the laser light is irradiated and the center of the track of the optical disk, and the focus servo control is servo control that uses a focus error signal indicating a deflection between the position where the laser light is focused and the record face of the optical disk. The tracking error signal and the focus error signal are signals generated by using the outputs of two or more light receiving elements that detect the reflected light from the optical disk.

On the other hand, the output of the light receiving element (quantity of reflected light from the optical disk) changes greatly between the reading time and the recording time, because the power of the laser light irradiated to the optical disk at the reading time is different from that at the recording time, as mentioned above. Therefore, if the same parameters (amplification factors) are employed to generate the tracking error signal and the focus error signal when reading and recording, the servo operation becomes unstable because the amplitude of the generated tracking error signal and the focus error signal greatly change as the output of the light receiving element changes. Thus, it has been proposed that the parameters used to generate the tracking error signal and the focus error signal are changed when reading and recording to make the amplitude of the tracking error signal and the focus error signal generated when recording and when reading equal (e.g., refer to JP-A-2001-93165).

Also, it has been proposed that the parameters used to generate the tracking error signal and the focus error signal are changed according to the total sum of the outputs of two or more light receiving elements to make the amplitude of the tracking error signal and the focus error signal generated when recording and when reading equal (e.g., refer to patent JP-A-2001-266371 and JP-A-2002-260250.

Moreover, since the reflectivity is greatly different between the recorded area (area where the pit is formed) and the unrecorded area (where the pit is not formed) of the optical disk even when reading, the output of the light receiving element changes greatly. Thus, it has been proposed that, to suppress the unstable servo operation when seeking from one area of the recorded area and the unrecorded area to the other area, the parameters used to generate the tracking error signal and the focus error signal are changed depending on the recorded area and the unrecorded area, to make the amplitude of the tracking error signal and the focus error signal generated in the recording area and the unrecorded area equal (e.g., refer to JP-A-2003-242660).

SUMMARY OF THE INVENTION

However, a method for deciding the parameters used to generate the tracking error signal and the focus error signal when reading and recording was not particularly described in JP-A-2001-93165.

The parameters used to generate the tracking error signal and the focus error signal when reading can be decided depending on the outputs of the light receiving elements by actually applying the laser light of read power to the optical disk. However, for the parameters used to generate the tracking error signal and the focus error signal when recording, if the laser light of record power is actually applied to the optical disk, the recorded data is broken. Accordingly, the parameters used to generate the tracking error signal and the focus error signal when recording can not be decided by actually applying the laser light of record power to the optical disk.

Also, with a constitution in which the parameters used to generate the tracking error signal and the focus error signal are changed according to the total sum of the outputs of two or more light receiving elements, there is a problem that an automatic gain control circuit (AGC circuit) must be provided, whereby the circuit scale is increased and the size of the device main body is increased, as described in JP-A-2001-266371 and JP-A-2002-260250.

It is an object of the present invention to provide an optical disk apparatus in which the change in the amplitude of the tracking error signal generated when reading and recording is suppressed and the device main body is miniaturized.

It is another object of the invention to provide an optical disk apparatus in which the change in the amplitude of the tracking error signal generated in the recorded area and the unrecorded area is suppressed and the device main body is miniaturized.

According an aspect of the invention, the optical disk apparatus includes the following configuration to solve the above-mentioned problems.

(1) An optical disk apparatus including:
a recording/reading unit for reading data recorded in an optical disk set on a main body by applying a laser light of a read power to the optical disk and recording data by applying the laser light of a record power greater than the read power;
a tracking error signal generation unit for detecting a reflected light from the optical disk with a plurality of light receiving elements, and generating a tracking error signal, employing an output of each light receiving element, when the recording/reading unit reads or records data from or in the optical disk;
a parameter setting unit for setting the parameters used for generating the tracking error signal to the tracking error signal generation unit; and
a tracking servo unit for making a tracking servo control with the tracking error signal generated by the tracking error signal generation unit;
in which the a parameter setting unit is unit for setting the reading time parameters at the reading time and setting the recording time parameters at the recording time;
wherein the tracking error signal generation unit divides the plurality of light receiving elements into a plurality of groups, and has a first balance adjustment part for amplifying the sum of the outputs of the light receiving elements belonging to every group, a second balance adjustment part for adjusting the output balance between groups by amplifying the output of the first balance adjustment part for every group, and an amplification part for amplifying an intermediate signal generated when the tracking error signal is generated employing the output of the second balance adjustment part for every group;

the a parameter setting unit is unit for setting the parameters including the amplification factors of the first balance adjustment part, the second balance adjustment part and the amplification part, comprising:

reading time parameter decision unit for deciding the amplification factor of the first balance adjustment part at the reading time so that the amplitude of its output may be at a preset first level for the every group, deciding the amplification factor of the second balance adjustment part at the reading time so that the amplitude of its output may be at a preset second level, when the amplification factor of the first balance adjustment part is the amplification factor at the reading time decided herein, and deciding the amplification factor of the amplification part at the reading time so that the amplitude of the generated tracking error signal may be at a preset third level, when the amplification factors of the first balance adjustment part and the second balance adjustment part are the amplification factors at the reading time decided herein, in a state where the laser light of the read power is applied to the optical disk set on the main body; and recording time parameter decision unit for deciding the amplification factor of the first balance adjustment part at the reading time decided by the reading time parameter decision unit for the optical disk set on the main body to the amplification factor of the first balance adjustment part at the recording time, deciding the amplification factor of the second balance adjustment part at the recording time so that the amplitude of its output may be at the preset second level in a state where the laser light of the read power is applied, and when the amplification factor of the first balance adjustment part is set to the amplification factor at the reading time multiplied by the preset first ratio, and deciding the amplification factor of the amplification part at the reading time so that the amplitude of the generated tracking error signal may be at the preset third level, when the amplification factor of the first balance adjustment part is equal to the amplification factor at the reading time multiplied by a preset first ratio, and the amplification factor of the second balance adjustment part is equal to the amplification factor at the reading time decided herein.

With this configuration, the a parameter setting unit sets the reading time parameters as the parameters used for generating the focus error signal to the tracking error signal generation unit when reading, and sets the recording time parameters when recording. The parameters used for generating the tracking error signal include the amplification factors for the first balance adjustment part, the second balance adjustment part and the amplification part. The reading time parameters are decided by the reading time parameter decision unit. The reading time parameter decision unit decides the amplification factors so that the outputs of the first balance adjustment part, the second balance adjustment part and the amplification part may be at the proper levels in a state where the laser light of the read power is applied to the optical disk set on the main body. Accordingly, the tracking error signal with the proper amplitude level can be generated when reading, whereby the unstable servo operation is prevented.

Also, the recording time parameter decision unit decides the amplification factor of the first balance adjustment part at the recording time as the amplification factor at the reading time. Also, the recording time parameter decision unit decides the amplification factor of the first balance adjustment part as the amplification factor at the reading time multiplied by the first ratio in a state where the laser light of the read power is applied to the optical disk, and decides the amplification factor of each part so that the outputs of the second balance adjustment part and the amplification part may be at the proper levels. This first ratio is calculated by acquiring the ratio of the outputs of the light receiving elements when the laser light of read power is applied to the optical disk and when the laser light of record power is applied to the optical disk for each of a number of optical disks, and performing the statistical processing for those ratios. Thereby, the state where the laser light of record power is applied to the optical disk can be artificially produced. Accordingly, the tracking error signal with the proper amplitude level can be generated when reading, whereby the unstable servo operation is prevented.

Since the tracking error signal with the proper amplitude level can be generated at the reading and at the recording without providing the automatic gain control circuit, the device main body is reduced in size and cost without making unstable the operation of tracking servo control at the reading and at the recording.

(2) The reading time parameters include the recorded area parameters for a recorded area and the unrecorded area parameters for an unrecorded area;

the a parameter setting unit is unit for setting the recorded area parameters to the tracking error signal generation unit if the laser light is applied to the recorded area, and setting the unrecorded area parameters to the tracking error signal generation unit if the laser light is applied to the unrecorded area;

the reading time parameter decision unit has the amplification factors decided for the first balance adjustment part, the second balance adjustment part and the amplification part, as the recorded area parameters, if the laser light of the read power is applied to the recorded area, comprising:

unit for deciding a recorded area amplification factor of the first balance adjustment part decided by the reading time parameter decision unit for the optical disk set on the main body to an unrecorded area amplification factor of the first balance adjustment part, deciding the unrecorded area amplification factor of the second balance adjustment part so that the amplitude of its output may be at the preset second level in a state where the laser light of the read power is applied, and when the amplification factor of the first balance adjustment part is set to the recorded area amplification factor multiplied by the preset second ratio, and deciding the unrecorded area amplification factor of the amplification part so that the amplitude of the generated tracking error signal maybe at the preset third level, when the amplification factor of the first balance adjustment part is equal to the recorded area amplification factor multiplied by the preset second ratio, and the amplification factor of the second balance adjustment part is equal to the unrecorded area amplification factor decided herein.

With this configuration, when deciding the reading time parameters, the reading time parameter decision unit has the reading time parameters decided at this time as the recorded area parameters, if the record area of the optical disk to which the laser light of the read power is applied is the recorded area (where the pit is formed). Also, the reading time parameter decision unit decides the amplification factor of the first balance adjustment part for unrecorded area as the amplification factor for recorded area. Also, the reading time parameter decision unit decides the amplification factor of each part so that the outputs of the second balance adjustment part and the amplification part may be at the proper levels, when the amplification factor of the first balance adjustment part is set to the amplification factor for unrecorded area multiplied by the second factor in a state where the laser light of read power is applied to the optical disk. This second ratio is calculated by acquiring the ratio of the outputs of the light receiving elements when the laser light of read power is applied to the recorded area of the optical disk and when the laser light of read power is applied to the unrecorded area of the optical disk for each of a number of optical disks, and performing the statistical processing for those ratios. Thereby, the state where the laser light is applied to the unrecorded area of the optical disk can be artificially produced. In this artificially produced state, the amplification factors are decided so that the outputs of the second balance adjustment part and the amplification part may be at the proper levels. Accordingly, the tracking error signal with the proper amplitude level can be generated even when the unrecorded area parameters are set to the tracking error signal generation part.

Since the tracking error signal with the proper amplitude level can be generated without providing the automatic gain control circuit, regardless of whether the laser light is applied to the recorded area or the unrecorded area, the device main body is reduced in size and cost without making unstable the operation of tracking servo control in the recorded area and the unrecorded area.

It is determined whether the laser light is applied to the recorded area or the unrecorded area based on the presence or absence of an RF signal.

(3) The reading time parameters include the recorded area parameters for a recorded area and the unrecorded area parameters for an unrecorded area;

the a parameter setting unit is unit for setting the recorded area parameters to the tracking error signal generation unit if the laser light is applied to the recorded area, and setting the unrecorded area parameters to the tracking error signal generation unit if the laser light is applied to the unrecorded area;

the reading time parameter decision unit has the amplification factors decided for the first balance adjustment part, the second balance adjustment part and the amplification part, as the unrecorded area parameters, if the laser light of the read power is applied to the unrecorded area, comprising:

unit for deciding an unrecorded area amplification factor of the first balance adjustment part decided by the reading time parameter decision unit for the optical disk set on the main body to a recorded area amplification factor of the first balance adjustment part, deciding the recorded area amplification factor of the second balance adjustment part so that the amplitude of its output may be at the preset second level in a state where the laser light of the read power is applied, and when the amplification factor of the first balance adjustment part is equal to the unrecorded area amplification factor multiplied by the preset third ratio, and deciding the recorded area amplification factor of the amplification part so that the amplitude of the generated tracking error signal may be at the preset third level, when the amplification factor of the first balance adjustment part is equal to the unrecorded area amplification factor multiplied by the preset third ratio, and the amplification factor of the second balance adjustment part is equal to the recorded area amplification factor decided herein.

With this configuration, in deciding the reading time parameters, the reading time parameter decision unit has the reading time parameters decided at this time as the unrecorded area parameters, if the record area of the optical disk to which the laser light of the read power is applied is the unrecorded area (where no pit is formed). Also, the reading time parameter decision unit decides the amplification factor of the first balance adjustment part for recorded area as the amplification factor for unrecorded area. Also, the reading time parameter decision unit decides the amplification factor of each part so that the outputs of the second balance adjustment part and the amplification part may be at the proper levels, when the amplification factor of the first balance adjustment part is set to the amplification factor for unrecorded area multiplied by the third factor in a state where the laser light of read power is applied to the optical disk. This third ratio is calculated by acquiring the ratio of the outputs of the light receiving elements when the laser light of read power is applied to the recorded area of the optical disk and when the laser light of read power is applied to the unrecorded area of the optical disk for each of a number of optical disks, and performing the statistical processing for those ratios. Thereby, the state where the laser light is applied to the recorded area of the optical disk can be artificially produced. In this artificially produced state, the amplification factors are decided so that the outputs of the second balance adjustment part and the amplification part may be at the proper levels. Accordingly, the tracking error signal with the proper amplitude level can be generated even when the recorded area parameters are set to the tracking error signal generation part.

Since the tracking error signal with the proper amplitude level can be generated without providing the automatic gain control circuit, regardless of whether the laser light is applied to the recorded area or the unrecorded area, the device main body is reduced in size and cost without making unstable the operation of tracking servo control in the recorded area and the unrecorded area, whereby the same effect as in (2) is achieved.

(4) The reading time parameter decision unit is unit for deciding the reading time parameters, when the power of the main body is turned on, or when the optical disk is set on the main body.

With this configuration, since the reading time parameters are decided according to the optical disk set on the main body, the tracking error signal with the proper amplitude level can be generated at the reading time, without having influence due to a difference between optical disks.

(5) The recording time parameter decision unit is unit for deciding the recording time parameters, when the reading time parameter decision unit decides the reading time parameters, or when data starts to be recorded in the optical disk.

With this configuration, since the reading time parameters are decided according to the optical disk set on the main body, the tracking error signal with the proper amplitude level can be generated at the reading time, without having influence due to a difference between optical disks.

(6) The optical disk apparatus further comprises disk type detection unit for detecting the type of the optical disk set on the main body, and prohibition unit for prohibiting the execution of the operation of deciding the recording time parameters for the recording time parameter decision unit, when the disk type detection unit detects that the optical disk set on the main body is the read-only disk.

With this configuration, if the optical disk set on the main body is the read-only disk, the operation of deciding the recording time parameters is not performed by the recording time parameter decision unit, whereby there is less waste produced by performing the useless operation.

since the tracking error signal with the proper amplitude level can be generated at the reading time and at the recording time, without providing the automatic gain control circuit, the device main body is reduced in size and cost without making unstable the operation of tracking servo control at the reading time and at the recording time.

since the tracking error signal with the proper amplitude level can be generated without providing the automatic gain control circuit, regardless of whether the laser light is applied to the recorded area or the unrecorded area, the operation of tracking servo control is not unstable in the recorded area and the unrecorded area.

BRIEF DESCRIPTION OF THE DRAWINGS

FIG. 3 is a view showing a focus parameter stored in the optical disk apparatus according to the embodiment of the invention.

FIG. 4 is a view showing a tracking parameter stored in the optical disk apparatus according to the embodiment of the invention.

DESCRIPTION OF THE PREFERRED EMBODIMENTS

An optical disk apparatus according to an embodiment of the present invention will be described below.

Figure 1:
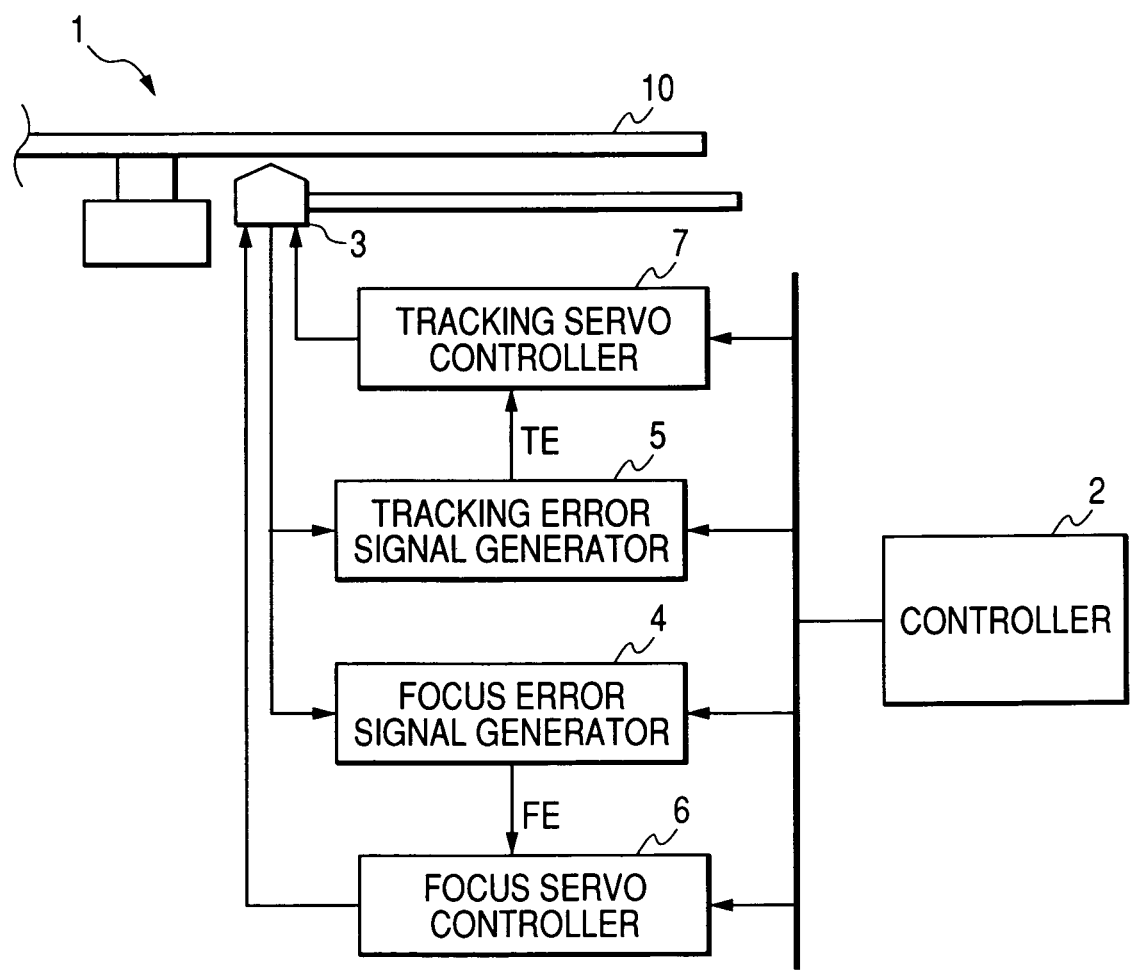
FIG. 1 is a diagram showing the configuration of a main part of an optical disk apparatus according to an embodiment of the present invention.

FIG. 1 is a diagram showing the configuration of a main part of the optical disk apparatus according to the embodiment of the invention. The optical disk apparatus 1 of this embodiment comprises a controller 2 for controlling the operation of a main body, a pickup head 3 for applying a laser light to an optical disk 10 and detecting its reflected light, a focus error signal generator 4 for generating a focus error signal, a tracking error signal generator 5 for generating a tracking error signal, a focus controller 6 for making the focus servo control based on the focus error signal generated by the focus error signal generator 4, and a tracking controller 7 for making the tracking servo control based on the tracking error signal generated by the tracking error signal generator 5. The optical disk apparatus 1 of this embodiment reads data recorded in the optical disk such as CD or DVD, or records data in the optical disk. The controller 2 is provided with a storage part for storing the control data for use to control the operation of the main body. The control data includes the focus parameters and the tracking parameters, a ratio of reflected light quantity when the laser light of read power is applied onto the recorded area (area where bits are formed) of the optical disk 10 to that when it is applied to the unrecorded area (area where bits are not formed), a ratio of reflected light quantity when the laser light of read power is applied onto the recorded area of the optical disk 10 to that when the laser light of record power is applied to the recorded area, and a ratio of reflected light quantity when the laser light of read power is applied onto the unrecorded area of the optical disk 10 to that when the laser light of record power is applied to the unrecorded area.

The pickup head 3 is movably attached to a shaft extending in the radial direction of the optical disk 10, like the well-known optical disk apparatus. A thread motor, not shown, moves the pickup head 3 in the radial direction of the optical disk 10. Also, the pickup head 3 is provided with an LD (laser diode) that is a light source for emitting the laser light, a detector 11 for detecting the reflected light from the optical disk 10, and an objective lens for controlling the illuminating position of laser light onto the optical disk 10. Also, it is provided with a two-axle actuator for moving the objective lens in the direction to or from the optical disk 10, and the radial direction of the optical disk 10. The detector 11 for detecting the reflected light from the optical disk 10 is formed of a plurality of light receiving elements.

The focus error signal generator 4 generates a focus error signal, based on the reflected light quantity from the optical disk 10 that is detected by the plurality of light receiving elements making up the detector 11 provided on the pickup head 3. The focus servo controller 6 makes the focus control for focusing the laser light on a record face of the optical disk 10 by supplying a servo signal based on the focus error signal generated by the focus error signal generator 4 to the actuator, and moving the objective lens of the pickup head 3 in the direction to or from the optical disk 10. The tracking error signal generator 5 generates a tracking error signal based on the reflected light quantity from the optical disk 10 detected by the plurality of light receiving elements making up the detector 11. The tracking servo controller 6 makes the tracking control for focusing the laser light in the center of the pickup head 3 by supplying a servo signal based on the tracking error signal generated by the tracking error signal generator 5 to the actuator, and moving the objective lens of the pickup head 3 in the radial direction of the optical disk 10. The controller 2 sets the parameters (focus parameter, tracking parameter for use to generate the focus error signal and the tracking error signal for the focus error signal generator 4 and the tracking error signal generator 5.

An RF signal with the reflected light from the optical disk 10 detected by the detector 11 is inputted into a regenerative part, not shown, and a regenerative signal is generated and outputted in the regenerative part. Also, the data is recorded on the optical disk by controlling the laser light applied onto the optical disk 10 according to the data that a recording part, not shown, records in the optical disk 10.

Figures 2A, 2B:
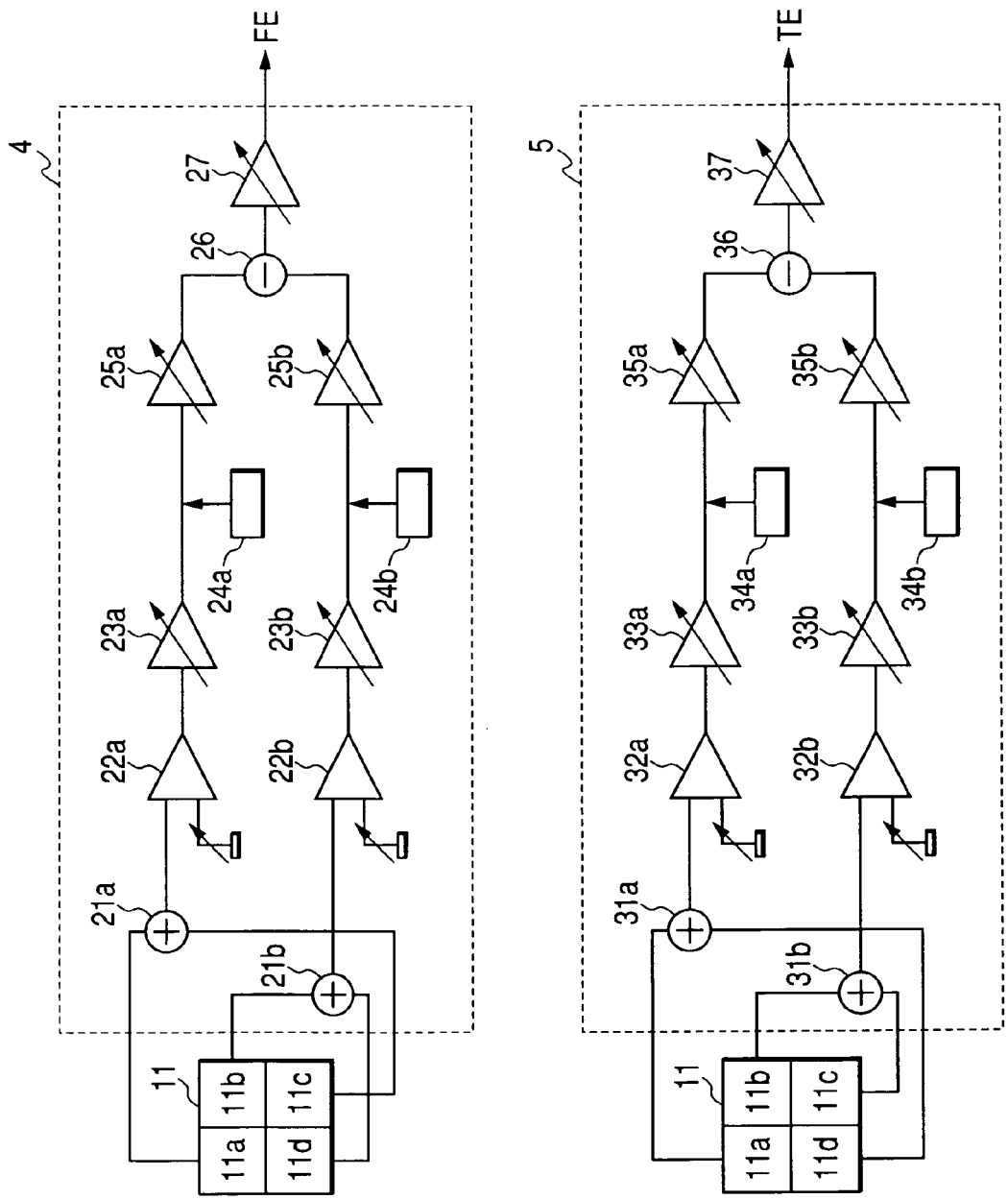
FIGS. 2A and 2B are diagrams showing the configuration of a focus error signal generator and a tracking error signal generator in the optical disk apparatus according to the embodiment of the invention.

FIG. 2A is a diagram showing the configuration of the focus error signal generator, and FIG. 2B is a diagram showing the configuration of the tracking error signal generator. In FIG. 2, reference numeral 11 denotes the detector provided in the pickup head 3. This detector 11 is the quadrant type in which four light receiving elements 11a to 11d are arranged longitudinally and transversely. The focus error signal generator 4 comprises an adder 21a for adding the outputs of the light receiving elements 11a and 11c, an adder 21b for adding the outputs of the light receiving elements 11b and 11d, an offset part 22a for adjusting the offset of the output of the adder 21a, an offset part 22b for adjusting the offset of the output of the adder 21b, an amplifier part 23a for amplifying the output of the offset part 22a, an amplifier part 23b for amplifying the output of the offset part 22b, an offset part 24a for adjusting the offset of the output of the amplifier part 23a, an offset part 24b for adjusting the offset of the output of the amplifier part 23b, an amplifier part 25a for amplifying the output of the offset part 24a, an amplifier part 25b for amplifying the output of the offset part 24b, a subtracter 26 for subtracting the outputs of the amplifier part 25a and 25b, and an amplifier part 27 for amplifying the output of the subtracter 26. The focus error signal generator 4 divides the light receiving elements 11a to 11d into a group including the light receiving elements 11a and 11c and a group including the light receiving elements 11b and 11d.

In this embodiment, the adders 21a, 21b, the offset parts 22a, 22b, and the amplifier parts 23a, 23b are constituted of an analog circuit, and the offset parts 24a, 24b, the amplifier parts 25a, 25b, the subtracter 26 and the amplifier part 27 are constituted of a digital circuit. An A/D converter, not shown, for performing the A/D conversion for the outputs of the amplifier parts 23a, 23b is provided between the amplifier parts 23a, 23b and the offset parts 24a, 24b. The controller 2 sets the parameters for the offset parts 22a, 22b, the amplifier parts 23a, 23b, the offset parts 24a, 24b, the amplifier parts 25a, 25b, and the amplifier part 27 to the focus error signal generator 4. The parameters that the controller 2 sets to the focus error signal generator 4 are the focus parameters.

The controller 2 stores three kinds of focus parameters, including the recorded area focus parameters (A1 to A9) set to the focus error signal generator 4 when the area of the optical disk 10 to which the laser light is applied at the reading time is the recorded area, the unrecorded area focus parameters (A1 to A4, A5' to A9') set to the focus error signal generator 4 when the area of the optical disk 10 to which the laser light is applied at the reading time is the unrecorded area, and the recording time focus parameters (A1 to A4, A5" to A9") set at the recording time to the focus error signal generator 4, as shown in FIG. 3. The focus parameters are parameters depending on the optical disk 10 set on the main body. A process for deciding the focus parameters will be described later.

The tracking error signal generator 5 comprises an adder 31a for adding the outputs of the light receiving elements 11a and 11d, an adder 31b for adding the outputs of the light receiving elements 11b and 11c, an offset part 32a for adjusting the offset of the output of the adder 31a, an offset part 32b for adjusting the offset of the output of the adder 31b, an amplifier part 33a for amplifying the output of the offset part 32a, an amplifier part 33b for amplifying the output of the offset part 32b, an offset part 34a for adjusting the offset of the output of the amplifier part 33a, an offset part 34b for adjusting the offset of the output of the amplifier part 33b, an amplifier part 35a for amplifying the output of the offset part 34a, an amplifier part 35b for amplifying the output of the offset part 34b, a subtracter 36 for subtracting the outputs of the amplifier part 35a and 35b, and an amplifier part 37 for amplifying the output of the subtracter 36, as shown in FIG. 2B. The amplifier parts 33a and 33b correspond to the first balance adjustment part as used in the embodiment, and the amplifier parts 35a and 35b correspond to the second balance adjustment part as used in the embodiment. The amplification factor of the amplifier parts 33a and 33b is decided so that the amplitude levels of the outputs of the amplifier parts 33a and 33b maybe equivalent. The tracking error signal generator 5 divides the light receiving elements 11a to 11d into a group including the light receiving elements 11a and 11d and a group including the light receiving elements 11b and 11c.

Also, the amplification factor of the amplifier parts 35a and 35b is decided so that the amplitude levels of the outputs of the amplifier parts 35a and 35b may be equivalent. The amplifier part 37 corresponds to the amplifier part as used in the embodiment. The output of the amplifier part 37 is the tracking error signal. The amplification factor of the amplifier part 37 is decided so that the amplitude level of its output may be the predetermined level.

In this embodiment, the adders 31a, 31b, the offset parts 32a, 32b, and the amplifier parts 33a, 33b are constituted of an analog circuit, and the offset parts 34a, 34b, the amplifier parts 35a, 35b, the subtracter 36 and the amplifier part 37 are constituted of a digital circuit. An A/D converter, not shown, for performing the A/D conversion for the outputs of the amplifier parts 33a, 33b is provided between the amplifier parts 33a, 33b and the offset parts 34a, 34b. The controller 2 sets the parameters for the offset parts 32a, 32b, the amplifier parts 33a, 33b, the offset parts 34a, 34b, the amplifier parts 35a, 35b, and the amplifier part 37 to the tracking error signal generator 5. The parameters that the controller 2 sets to the tracking error signal generator 5 are the tracking parameters.

The controller 2 stores three kinds of tracking parameters, including the recorded area tracking parameters (B1 to B9) set to the tracking error signal generator 5 when the area of the optical disk 10 to which the laser light is applied at the reading time is the recorded area, the unrecorded area tracking parameters (B1 to B4, B5' to B9') set to the tracking error signal generator 5 when the area of the optical disk 10 to which the laser light is applied at the reading time is the unrecorded area, and the recording time tracking parameters (B1 to B4, B5" to B9") set at the recording time to the tracking error signal generator 5, as shown in FIG. 4. The tracking parameters, like the focus parameters, are parameters depending on the optical disk 10 set on the main body. A process for deciding the tracking parameters will be described later.

Figure 5:
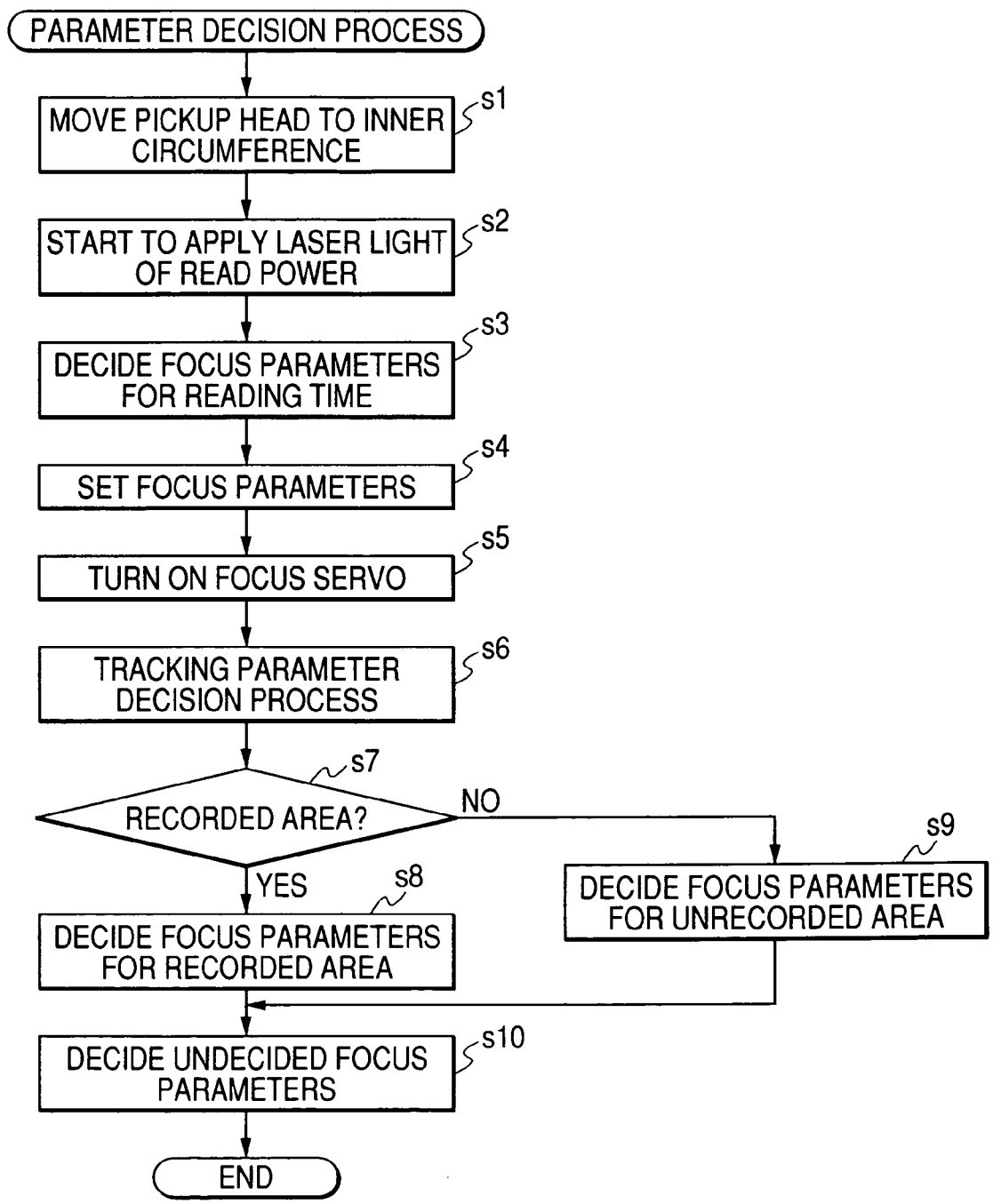
FIG. 5 is a flowchart showing a parameter decision process in the optical disk apparatus according to the embodiment of the invention.

The operation of the optical disk apparatus 1 according to this embodiment will be described below. The optical disk apparatus 1 of this embodiment performs a parameter decision process for deciding the focus parameters or tracking parameters set to the focus error signal generator 4 or the tracking error signal generator 5 when the power is turned on in a state where the optical disk is set on the main body, or when the optical disk 10 is set on the main part. FIG. 5 is a flowchart showing the parameter decision process.

First of all, the optical disk apparatus 1 moves the pickup head 3 to the inner circumference of the optical disk 10 by a thread motor, not shown (s1), and starts to apply the laser light of read power to the optical disk 10 (s2). Thereafter, the objective lens is moved in the direction to or from the optical disk 10, and the focus parameter for each part is decided based on the outputs of the offset parts 22a, 22b, the amplifier parts 23a, 23b, the offset parts 24a, 24b, the amplifier parts 25a, 25b, and the amplifier part 27 (s3). The focus parameters decided at step s3 are the reading time focus parameters, though it is uncertain that the focus parameters are for the recorded area or unrecorded area at this time. At step s3, the parameter for each part is decided in the following way.

The parameters A1 and A2 (offset values) for the offset parts 22a and 22b are decided so that the absolute values of the peak levels and the bottom levels of the outputs of the offset parts 22a and 22b may be equal. The parameters A3 and A4 (amplification factors) for the amplifier parts 22a and 22b are decided so that the peak levels of the outputs of the amplifier parts 22a and 22b may be the predetermined level F1. Thereby, the peak levels of the outputs of the amplifier parts 22a and 22b are equal. The parameters A5 and A6 (or A5' and A6') (offset values) for the offset parts 24a and 24b are decided so that the absolute values of the peak levels and the bottom levels of the outputs of the offset parts 24a and 24b may be equal. The offset parts 24a and 24b absorb a deflection in the offset with the A/D conversion in an A/D converter, not shown. The parameters A7 and A8 (or A7' and A8') (amplification factors) for the amplifier parts 25a and 25b are decided so that the peak levels of the outputs of the amplifier parts 25a and 25b may be the predetermined level F2. Thereby, the peak levels of the outputs of the amplifier parts 25a and 25b are equal. The parameter A9 (or A9') (amplification factor) for the amplifier part 27 is decided so that the peak level of the output of the amplifier part 27 may be the predetermined level F3. The level F3 is the amplitude level of the focus error signal at which the focus servo controller 6 can properly perform the focus servo. The levels F1 and F2 are decided based on the level F3.

The optical disk apparatus 1, which decides the reading time focus parameters at step s3, sets the focus parameters to the focus error signal generator 4 (s4), and then, turns on the focus servo control with the focus servo controller 6 (s5). At this time, the optical disk apparatus 1 continues to apply the laser light of read power to the optical disk 10. The optical disk apparatus 1 turns on the focus servo control at step s5, and performs a tracking parameter decision process for deciding the tracking parameters (s6).

Figure 6:
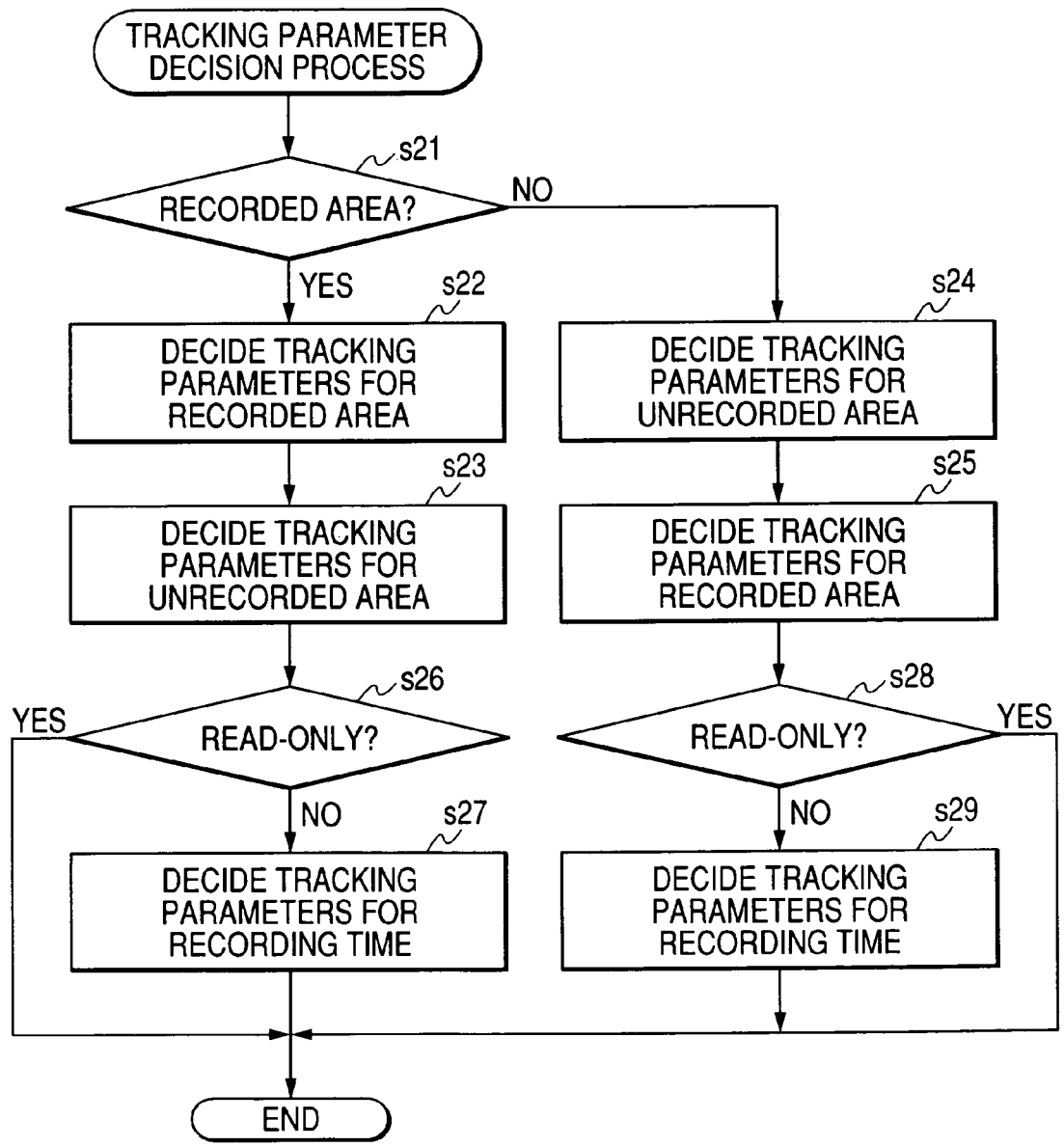
FIG. 6 is a flowchart showing a tracking parameter decision process in the optical disk apparatus according to the embodiment of the invention.

FIG. 6 is a flowchart showing the tracking parameter decision process. The optical disk apparatus 1 determines whether the area of the optical disk 10 to which the laser light of read power is applied is the recorded area where pits are formed or the unrecorded area where bits are not formed (s21). At step s21, the recorded area or the unrecorded area is determined according to the presence or absence of the RF signal. If the recorded area is determined at step s21, the optical disk apparatus 1 decides the recorded area tracking parameters (B1 to B9) (s22). At step s22, the recorded area tracking parameter for each part is decided based on the outputs of the offset parts 32a and 32b, the amplifier parts 33a and 33b, the offset parts 34a and 34b, the amplifier parts 35a and 35b, and the amplifier part 37. Specifically, the parameters B1 and B2 (offset values) for the offset parts 32a and 32b are decided so that the absolute values of the peak levels and the bottom levels of the outputs of the offset parts 32a and 32b may be equal. The parameters B3 and B4 (amplification factors) for the amplifier parts 33a and 33b are decided so that the peak levels of the outputs of the amplifier parts 33a and 33b may be the preset level T1 for the recorded area. This level T1 corresponds to the first level as used in the embodiment. Thereby, the peak levels of the outputs of the amplifier parts 32a and 32b are equal. The parameters B5 and B6 (offset values) for the offset parts 34a and 34b are decided so that the absolute values of the peak levels and the bottom levels of the outputs of the offset parts 34a and 34b may be equal. The offset parts 34a and 34b absorb a deflection in the offset with the A/D conversion in the A/D converter, not shown. The parameters B7 and B8 (amplification factors) for the amplifier parts 35a and 35b are decided so that the peak levels of the outputs of the amplifier parts 35a and 35b may be the preset level T2 for the recorded area. Thereby, the peak levels of the outputs of the amplifier parts 35a and 35b are equal. The level T2 corresponds to the second level as used in the embodiment. The parameter A9 (amplification factor) for the amplifier part 37 is decided so that the peak level of the output of the amplifier part 37 may be the preset level T3. The level T3 is the amplitude level of the tracking error signal at which the tracking servo controller 7 can properly perform the tracking servo, and corresponds to the third level as used in the embodiment. The levels T1 and T2 are decided based on the level T3.

The optical disk apparatus 1, which decides the recorded area tracking parameters (B1 to B9) at step s22, decides the unrecorded area tracking parameters (s23). The optical disk apparatus 1 has a ratio (unrecorded area/recorded area) of the outputs of the adder parts 21a and 21b when the laser light of read power is applied to the recorded area of the optical disk 10 and when it is applied to the unrecorded area. This ratio is the second ratio as used in the embodiment. This ratio is calculated by acquiring the ratio of the outputs of the adder parts 21a and 21b when the laser light of read power is applied to the recorded area of the optical disk 10 and when it is applied to the unrecorded area of the optical disk 10 for each of a number of optical disks, and performing the statistical processing for those ratios. The parameters for the offset parts 32a, 32b and the amplifier parts 33a, 33b are the same values (B1 to B4) as the recorded area parameters decided at step s22.

The optical disk apparatus 1 sets the parameters for the offset parts 32a and 32b to the parameters B1 and B2 decided ahead, and sets the parameters for the amplifier parts 33a and 33b to the parameters B3 and B4 decided ahead, multiplied by the ratio of the outputs of the adder parts 21a and 21b when the laser light of read power is applied to the recorded area of the optical disk 10 and when it is applied to the unrecorded area, the ratio being stored in the controller 2. Thereby, the state where the laser light is applied to the unrecorded area can be artificially produced for the offset parts 34a and 34b and following. In this state, the optical disk apparatus 1 decides the parameters B5' to B9' for the offset parts 34a and 34b, the amplifier parts 35a and 35b, and the amplifier part 37. The parameters B5' and B6' (offset values) for the offset parts 34a and 34b are decided so that the absolute values of the peak levels and the bottom levels of the outputs of the offset parts 34a and 34b may be equal. The parameters B7' and B8' (amplification factors) for the amplifier parts 35a and 35b are decided so that the peak levels of the outputs of the amplifier parts 35a and 35b may be the preset level T2 for the recorded area. The parameter B9' (amplification factor) for the amplifier part 37 is decided so that the peak level of the output of the amplifier part 37 may be the preset level T3.

In this way, when the recorded area tracking parameters are decided by applying the laser light of read power to the recorded area, the optical disk apparatus 1 artificially produces a state where the laser light is applied to the unrecorded area, and in this state, the unrecorded area tracking parameters B5' to B9' for the offset parts 34a and 34b, the amplifier parts 35a and 35b, and the amplifier part 37 are decided. Accordingly, when the laser light is applied to the unrecorded area, the proper unrecorded area tracking parameters in which the operation of tracking servo control is stabilized can be obtained. Also, in the process for deciding the recorded area tracking parameters and the process for deciding the unrecorded area tracking parameters, the time taken to perform the processes for deciding these two kinds of tracking parameters is shortened, because the process for moving the pickup head 3 is not required.

On the other hand, if the unrecorded area is determined at step s21, the optical disk apparatus 1 decides the unrecorded area tracking parameters (B1 to B4, B5' to B9') (s24). The process at step s24 is substantially the same as the step s22. At step s24, the unrecorded area tracking parameter for each part is decided based on the outputs of the offset parts 32a and 32b, the amplifier parts 33a and 33b, the offset parts 34a and 34b, the amplifier parts 35a and 35b, and the amplifier part 37. Specifically, the parameters B1 and B2 (offset values) for the offset parts 32a and 32b are decided so that the absolute values of the peak levels and the bottom levels of the outputs of the offset parts 32a and 32b may be equal. The parameters B3 and B4 (amplification factors) for the amplifier parts 33a and 33b are decided so that the peak levels of the outputs of the amplifier parts 33a and 33b may be the preset level T1 for the recorded area. This level T1 corresponds to the first level as used in the embodiment. The parameters B5 and B6 (offset values) for the offset parts 34a and 34b are decided so that the absolute values of the peak levels and the bottom levels of the outputs of the offset parts 34a and 34b may be equal. The parameters B7 and B8 (amplification factors) for the amplifier parts 35a and 35b are decided so that the peak levels of the outputs of the amplifier parts 35a and 35b may be the preset level T2 for the recorded area. Thereby, the peak levels of the outputs of the amplifier parts 35a and 35b are equal. The level T2 corresponds to the second level as used in the embodiment. The parameter B9 (amplification factor) for the amplifier part 37 is decided so that the peak level of the output of the amplifier part 37 maybe the preset level T3. The level T3 is the amplitude level of the tracking error signal at which the tracking servo controller 7 can properly perform the tracking servo, and corresponds to the third level as used in the embodiment.

If the unrecorded area tracking parameters (B1 to B4, B5' to B9') are decided at step s24, the optical disk apparatus 1 decides the recorded area tracking parameters (s25). The optical disk apparatus 1 has a ratio (recorded area/unrecorded area) of the outputs of the adder parts 21a and 21b when the laser light of read power is applied to the unrecorded area of the optical disk 10 and when it is applied to the recorded area. This ratio corresponds to the third ratio as used in the embodiment. This ratio is the inverse of the ratio as used at step s23. Accordingly, any one of the ratios may be stored in the controller 2. The parameters for the offset parts 32a, 32b and the amplifier parts 33a, 33b are decided at the same values (B1 to B4) as the unrecorded area parameters decided at step s24.

The optical disk apparatus 1 sets the parameters for the offset parts 32a and 32b to the parameters B1 and B2 decided ahead, and sets the parameters for the amplifier parts 33a and 33b to the parameters B3 and B4 decided ahead, multiplied by the ratio of the outputs of the adder parts 21a and 21b when the laser light of read power is applied to the unrecorded area of the optical disk 10 and when it is applied to the recorded area, the ratio being stored in the controller 2. Thereby, the state where the laser light is applied to the recorded area can be artificially produced for the offset parts 34a and 34b and following. In this state, the optical disk apparatus 1 decides the parameters B5 to B9 for the offset parts 34a and 34b, the amplifier parts 35a and 35b, and the amplifier part 37. The parameters B5 and B6 (offset values) for the offset parts 34a and 34b are decided so that the absolute values of the peak levels and the bottom levels of the outputs of the offset parts 34a and 34b may be equal. The parameters B7 and B8 (amplification factors) for the amplifier parts 35a and 35b are decided so that the peak levels of the outputs of the amplifier parts 35a and 35b may be the preset level T2 for the recorded area. The parameter B9 (amplification factor) for the amplifier part 37 is decided so that the peak level of the output of the amplifier part 37 may be the preset level T3.

In this way, when the unrecorded area tracking parameters are decided by applying the laser light of read power to the unrecorded area, the optical disk apparatus 1 artificially produces a state where the laser light is applied to the recorded area, and in this state, the recorded area tracking parameters B5 to B9 for the offset parts 34a and 34b, the amplifier parts 35a and 35b, and the amplifier part 37 are decided. Accordingly, when the laser light is applied to the recorded area, the proper recorded area tracking parameters in which the operation of tracking servo control is stabilized can be obtained. Also, in the process for deciding the unrecorded area tracking parameters and the process for deciding the recorded area tracking parameters, the time taken to perform the processes for deciding these two kinds of tracking parameters is shortened, because the process for moving the pickup head 3 is not required.

If the unrecorded area tracking parameters are decided at step s23, the optical disk apparatus 1 determines whether or not the optical disk 10 set on the main body is the read-only disk (s26). If it is determined that the optical disk 10 is the read-only disk at step s26, this process is ended. On the other hand, if it is determined that the optical disk 10 is the write-once disk or the rewritable disk, the recording time tracking parameters are decided (s27), and this process is ended. The optical disk apparatus 1 has a ratio A (record power/read power) of the outputs of the adder parts 21a and 21b when the laser light of read power is applied to the recorded area of the optical disk 10 and when the laser light of record power is applied. This ratio A corresponds to the first ratio as used in the embodiment. This ratio A is calculated by acquiring the ratio of the outputs of the adder parts 21a and 21b when the laser light of read power is applied to the recorded area of the optical disk 10 and when the laser light of record power is applied to the optical disk 10 for each of a number of optical disks, and performing the statistical processing for those ratios.

Also, the optical disk apparatus 1 has a ratio A' (record power/read power) of the outputs of the adder parts 21a and 21b when the laser light of read power is applied to the unrecorded area of the optical disk 10 and when the laser light of record power is applied, as will be described later. This ratio A' corresponds to the first ratio as used in the embodiment.

The optical disk apparatus 1 decides the parameters for the offset parts 32a, 32b and the amplifier parts 33a, 33b at the same values (B1 to B4) as the recorded area parameters decided at step s22.

The optical disk apparatus 1 sets the parameters for the offset parts 32a and 32b to the parameters B1 and B2 decided ahead, and sets the parameters for the amplifier parts 33a and 33b to the parameters B3 and B4 decided ahead, multiplied by the ratio A stored in the controller 2. Thereby, the state where the laser light of record power is applied to the optical disk 10 can be artificially produced for the offset parts 34a and 34b and following. In this state, the optical disk apparatus 1 decides the parameters B5" to B9" for the offset parts 34a and 34b, the amplifier parts 35a and 35b, and the amplifier part 37. The parameters B5" and B6" (offset values) for the offset parts 34a and 34b are decided so that the absolute values of the peak levels and the bottom levels of the outputs of the offset parts 34a and 34b may be equal. The parameters B7" and B8" (amplification factors) for the amplifier parts 35a and 35b are decided so that the peak levels of the outputs of the amplifier parts 35a and 35b may be the preset level T2 for the recorded area. The parameter B9" (amplification factor) for the amplifier part 37 is decided so that the peak level of the output of the amplifier part 37 may be the preset level T3.

In this way, when the recorded area tracking parameters are decided by applying the laser light of read power to the recorded area, the optical disk apparatus 1 artificially produces a state where the laser light of record power is applied to the optical disk 10, and in this state, the recording time tracking parameters B5" to B9" for the offset parts 34a and 34b, the amplifier parts 35a and 35b, and the amplifier part 37 are decided. Accordingly, when the laser light of record power is applied (at the recording time), the proper recording time tracking parameters in which the operation of tracking servo control is stabilized can be obtained. Also, in the process for deciding the recorded area tracking parameters, the process for deciding the unrecorded area tracking parameters, and the process for deciding the recording time tracking parameters, the time taken to perform the processes for deciding these three kinds of tracking parameters is shortened, because the process for moving the pickup head 3 is not required. Further, if it is determined at step s26 that the optical disk 10 is the read-only disk, an increase in the processing time due to execution of a wasteful process is suppressed, because the process for deciding the recording time tracking parameters is not performed.

If the recorded area tracking parameters are decided at step s25, the optical disk apparatus 1 determines whether or not the optical disk 10 set on the main body is the read-only disk (s28). If it is determined that the optical disk 10 is the read-only disk at step s28, this process is ended. On the other hand, if it is determined that the optical disk 10 is the write-once disk or the rewritable disk, the recording time tracking parameters are decided (s29), and this process is ended. The optical disk apparatus 1 has a ratio A' (record power/read power) of the outputs of the adder parts 21a and 21b when the laser light of read power is applied to the unrecorded area of the optical disk 10 and when the laser light of record power is applied. This ratio A' is calculated by acquiring the ratio of the outputs of the adder parts 21a and 21b when the laser light of read power is applied to the unrecorded area of the optical disk 10 and when the laser light of record power is applied to the optical disk 10 for each of a number of optical disks, and performing the statistical processing for those ratios. The optical disk apparatus 1 decides the parameters for the offset parts 32a, 32b and the amplifier parts 33a, 33b at the same values (B1 to B4) as the recorded area parameters decided at step s24.

The optical disk apparatus 1 sets the parameters for the offset parts 32a and 32b to the parameters B1 and B2 decided ahead, and sets the parameters for the amplifier parts 33a and 33b to the parameters B3 and B4 decided ahead, multiplied by the ratio A' stored in the controller 2. Thereby, the state where the laser light of record power is applied to the optical disk 10 can be artificially produced for the offset parts 34a and 34b and following. In this state, the optical disk apparatus 1 decides the parameters B5" to B9" for the offset parts 34a and 34b, the amplifier parts 35a and 35b, and the amplifier part 37. The process for deciding the parameters B5" to B9" is the same as the process for deciding the parameters B5' to B9', and is not described here.

In this way, when the unrecorded area tracking parameters are decided by applying the laser light of read power to the unrecorded area, the optical disk apparatus 1 artificially produces a state where the laser light of record power is applied to the optical disk 10, and in this state, the recording time tracking parameters B5" to B9" for the offset parts 34a and 34b, the amplifier parts 35a and 35b, and the amplifier part 37 are decided. Accordingly, when the laser light of record power is applied (at the recording time), the proper recording time tracking parameters in which the operation of tracking servo control is stabilized can be obtained.

Returning to FIG. 5, if the recorded area is determined at step s21, the optical disk apparatus 1 decides the focus parameters decided at step s3 as the recorded area focus parameters (s7, s8). On the contrary, if the unrecorded area is determined at step s21, the optical disk apparatus 1 decides the focus parameters decided at step s3 as the unrecorded area focus parameters (s7, s9). The optical disk apparatus 1 decides two kinds of focus parameters as the recording time focus parameter and unrecorded area focus parameter or recorded area focus parameter) that are undecided at this time (s10), and this process is ended. If the recorded area focus parameters are already decided, the undecided two kinds of focus parameters are decided, on the basis of the recorded area focus parameters, employing the ratios for the offset parts 34a and 34b, the amplifier parts 35a and 35b, and the amplifier part 37 between three kinds of tracking parameters at step s10. Also, if the unrecorded area focus parameters are already decided, the undecided two kinds of focus parameters are decided, on the basis of the unrecorded area focus parameters, employing the ratios for the offset parts 34a and 34b, the amplifier parts 35a and 35b, and the amplifier part 37 between three kinds of tracking parameters. For example, the recorded area parameter A5 for the offset part 24a, multiplied by the ratio between the recorded area parameter and the unrecorded area parameter for the offset part 34a, is the recorded area parameter A5' for the offset part 24a.

Accordingly, it is possible to decide the proper focus parameters for the recorded area, the unrecorded area and the recording time.

The optical disk apparatus 1 stores the focus parameters and the tracking parameters that are decided through the above processes in the controller 2, and sets the focus parameters and tracking parameters of the kind according to the state at that time to the focus error signal generator 4, the tracking error signal generator 5. Accordingly, when the laser light of read power is applied to the recorded area, when the laser light of read power is applied to the unrecorded area, or when the laser light of record power is applied, the servo operation does not become unstable, and the reliability of the optical disk apparatus is improved. Also, since the automatic gain control circuit is not required unlike the prior art, the device main body is reduced in size and cost.

In the above embodiment, when the power is turned on in a state where the optical disk 10 is set on the main body, or when the optical disk 10 is set on the main body, the recording time focus parameters and the recording time tracking parameters can be decided. However, these parameters may be decided when the device main body is required to record the data on the optical disk 10.

Figure 7:
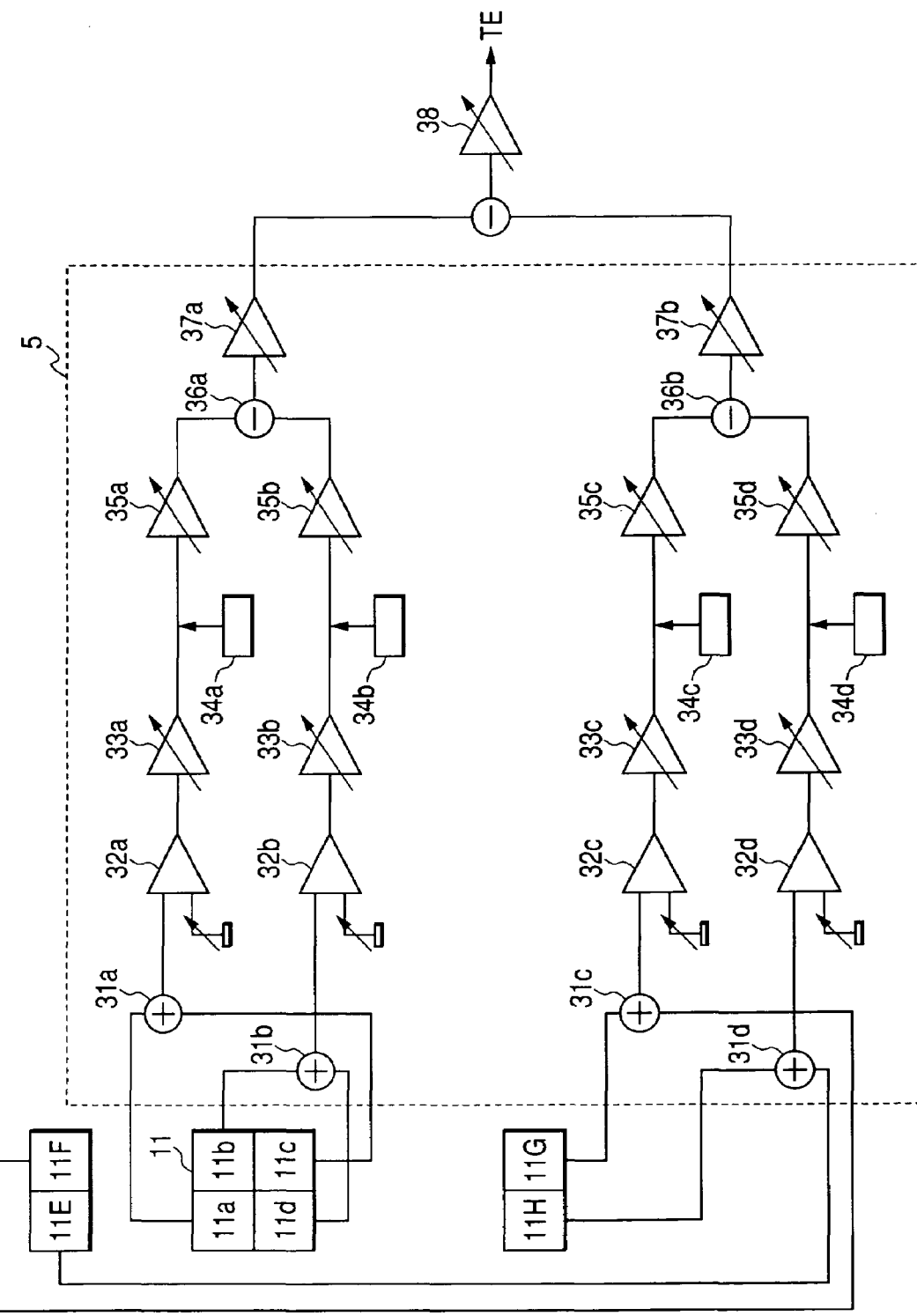
FIG. 7 is a diagram showing the configuration of a tracking error signal generator in the device for generating a tracking error signal by a DPP method.

Moreover, in the device for generating the tracking error signal by the DPP method, when a processor for processing the output of the light receiving element that detects the reflected light quantity of sub-beam (the same processor as in FIG. 2B) is provided, and the recorded area tracking parameters are decided by applying the laser light of read power to the recorded area of the optical disk 10, the unrecorded area tracking parameters and the recording time tracking parameters may be decided by artificially producing a state where the laser light of read power is applied to the unrecorded area of the optical disk 10, and a state where the laser light of record power is applied to the optical disk 10. FIG. 7 shows the configuration of the tracking error signal generator in the device for generating the tracking error signal by the DPP method.

What is claimed is:

1. An optical disk apparatus comprising:
   a recording/reading unit for reading data recorded in an optical disk set on a main body by applying a laser light of a read power to the optical disk and recording data by applying a laser light of a record power greater than the laser light of the read power to the optical disk;
   a tracking error signal generation unit for detecting a reflected light from the optical disk with a plurality of light receiving elements, and generating a tracking error signal employing an output of each light receiving element when the recording/reading unit records/reads data on/from the optical disk;

a parameter setting unit for setting parameters used by the tracking error signal generation unit for generating the tracking error signal;

a tracking servo unit for performing a tracking servo control with the tracking error signal generated by the tracking error signal generation unit, wherein the parameter setting unit sets reading time parameters when the recording/reading unit reads data from the optical disk at a reading time and sets recording time parameters when the recording/reading unit records data on the optical disk at a recording time, wherein the tracking error signal generation unit divides the plurality of light receiving elements into a plurality of groups, and wherein the tracking error signal generation unit includes a first balance adjustment part for amplifying a sum of the outputs of the light receiving elements belonging to each group, a second balance adjustment part for adjusting an output balance between at least two of the plurality of groups by amplifying an output of the first balance adjustment part for each group, and an amplification part for amplifying an intermediate signal generated when the tracking error signal is generated by employing an output of the second balance adjustment part for each group, wherein the parameter set by the parameter setting unit include the amplification factors of the first balance adjustment part, the second balance adjustment part, and the amplification part, wherein the optical disk apparatus further comprises:

a reading time parameter decision unit for deciding the amplification factor of the first balance adjustment part at the reading time so that the amplitude of the output of the first balance adjustment part at the reading time is at a preset first level for each group, deciding the amplification factor of the second balance adjustment part at the reading time so that the amplitude of the output of the second balance adjustment part at the reading time is at a preset second level when the amplification factor of the first balance adjustment part at the reading time has been decided by the reading time parameter decision unit, and deciding the amplification factor of the amplification part at the reading time so that the amplitude of the generated tracking error signal may be at a preset third level when the amplification factors of the first balance adjustment part and the second balance adjustment part at the reading time have been decided by the reading time parameter decision unit;

a recording time parameter decision unit for deciding the amplification factor of the first balance adjustment part at the reading time decided by the reading time parameter decision unit for the optical disk set on the main body as the amplification factor of the first balance adjustment part at the recording time, deciding the amplification factor of the second balance adjustment part at the recording time so that the amplitude of the output of the second balance adjustment part at the recording time is at the preset second level in a state where the laser light of the read power is applied when the amplification factor of the first balance adjustment part at the recording time is set to the amplification factor at the reading time multiplied by a preset first ratio, and deciding the amplification factor of the amplification part at the recording time so that the amplitude of the generated tracking error signal is at the preset third level when the amplification factor of the first balance adjustment part at the recording time is set to the amplification factor of the first balance adjustment part at the reading time multiplied by the preset first ratio and the amplification factor of the second balance adjustment part at the recording time has been decided by the recording time parameter decision unit, wherein the reading time parameters include recorded area parameters for a recorded area of the optical disk and unrecorded area parameters for an unrecorded area of the optical disk, wherein the parameter setting unit sets the recorded area parameters when the laser light of the read power is applied to the recorded area of the optical disk, and sets the unrecorded area parameters when the laser light of the read power is applied to the unrecorded area of the optical disk, wherein, if the laser light of the read power is applied to the recorded area of the optical disk, the reading time parameter decision unit decides the amplification factors for the first balance adjustment part, the second balance adjustment part and the amplification part at the reading time as the recorded area parameters, decides a recorded area amplification factor of the first balance adjustment part at the reading time as an unrecorded area amplification factor of the first balance adjustment part at the reading time, decides an unrecorded area amplification factor of the second balance adjustment part at the reading time so that the amplitude of the output of the second balance adjustment part at the reading time is at the preset second level when the amplification factor of the first balance adjustment part at the reading time is set to the recorded area amplification factor multiplied by a preset second ratio, and decides an unrecorded area amplification factor of the amplification part at the reading time so that the amplitude of the generated tracking error signal is at the preset third level when the amplification factor of the first balance adjustment part at the reading time is set to the recorded area amplification factor multiplied by the preset second ratio and the amplification factor of the second balance adjustment part at the reading time is set to the unrecorded area amplification factor;

or if the laser light of the read power is applied to the unrecorded area, the reading time parameter decision unit decides the amplification factors for the first balance adjustment part, the second balance adjustment part and the amplification part as the unrecorded area parameters if the laser light of the read power is applied to the unrecorded area, decides the unrecorded area amplification factor of the first balance adjustment part at the reading time as the recorded area amplification factor of the first balance adjustment part at the reading time, decides the recorded area amplification factor of the second balance adjustment part at the reading time so that the amplitude of the output of the second balance adjustment part at the reading time is at the preset second level when the amplification factor of the first balance adjustment part is set to the unrecorded area amplification factor multiplied by a preset third ratio, and decides the recorded area amplification factor of the amplification part at the reading time so that the amplitude of the generated tracking error signal is at the preset third level when the amplification factor of the first balance adjustment part at the reading time is set to the unrecorded area amplification factor multiplied by the preset third ratio and the amplification factor of the second balance adjustment part at the reading time is set to the recorded area amplification factor;

wherein the reading time parameter decision unit decides the reading time parameters when power of the main body is turned on or when the optical disk is set on the main body; and wherein the recording time parameter decision unit decides the recording time parameters when the reading time parameter decision unit decides the reading time parameters or when the recording/reading unit starts to record data on the optical disk, wherein the optical disk apparatus further comprises:

a disk type detection unit for detecting the type of the optical disk set on the main body, and a prohibition unit for prohibiting the recording time parameter decision unit from deciding the recording time parameters when the disk type detection unit detects that the optical disk set on the main body is a read-only disk.

2. An optical disk apparatus comprising:

a recording/reading unit for reading data recorded in an optical disk set on a main body by applying a laser light of a read power to the optical disk and recording data by applying a laser light of a record power greater than the laser light of the read power to the optical disk;

a tracking error signal generation unit for detecting a reflected light from the optical disk with a plurality of light receiving elements, and generating a tracking error signal employing an output of each light receiving element when the recording/reading unit records/reads data on/from the optical disk;

a parameter setting unit for setting parameters used by the tracking error signal generation unit for generating the tracking error signal;

a tracking servo unit for performing a tracking servo control with the tracking error signal generated by the tracking error signal generation unit, wherein the parameter setting unit sets reading time parameters when the recording/reading unit reads data from the optical disk at a reading time and sets recording time parameters when the recording/reading unit records data on the optical disk at a recording time, wherein the tracking error signal generation unit divides the plurality of light receiving elements into a plurality of groups, and wherein the tracking error signal generation unit includes a first balance adjustment part for amplifying a sum of the outputs of the light receiving elements belonging to each group, a second balance adjustment part for adjusting an output balance between at least two of the plurality of groups by amplifying an output of the first balance adjustment part for each group, and an amplification part for amplifying an intermediate signal generated when the tracking error signal is generated by employing an output of the second balance adjustment part for each group, wherein the parameter set by the parameter setting unit include the amplification factors of the first balance adjustment part, the second balance adjustment part, and the amplification part, wherein the optical disk apparatus further comprises:

a reading time parameter decision unit for deciding the amplification factor of the first balance adjustment part at the reading time so that the amplitude of the output of the first balance adjustment part at the reading time is at a preset first level for each group, deciding the amplification factor of the second balance adjustment part at the reading time so that the amplitude of the output of the second balance adjustment part at the reading time is at a preset second level when the amplification factor of the first balance adjustment part at the reading time has been decided by the reading time parameter decision unit, and deciding the amplification factor of the amplification part at the reading time so that the amplitude of the generated tracking error signal may be at a preset third level when the amplification factors of the first balance adjustment part and the second balance adjustment part at the reading time have been decided by the reading time parameter decision unit; and a recording time parameter decision unit for deciding the amplification factor of the first balance adjustment part at the reading time decided by the reading time parameter decision unit for the optical disk set on the main body as the amplification factor of the first balance adjustment part at the recording time, deciding the amplification factor of the second balance adjustment part at the recording time so that the amplitude of the output of the second balance adjustment part at the recording time is at the preset second level in a state where the laser light of the read power is applied when the amplification factor of the first balance adjustment part at the recording time is set to the amplification factor at the reading time multiplied by a preset first ratio, and deciding the amplification factor of the amplification part at the recording time so that the amplitude of the generated tracking error signal is at the preset third level when the amplification factor of the first balance adjustment part at the recording time is set to the amplification factor of the first balance adjustment part at the reading time multiplied by the preset first ratio and the amplification factor of the second balance adjustment part at the recording time has been decided by the recording time parameter decision unit.

3. The optical disk apparatus according to claim 2, wherein:

the reading time parameters include recorded area parameters for a recorded area of the optical disk and unrecorded area parameters for an unrecorded area of the optical disk, the parameter setting unit sets the recorded area parameters when the laser light of the read power is applied to the recorded area of the optical disk, and sets the unrecorded area parameters when the laser light of the read power is applied to the unrecorded area of the optical disk, if the laser light of the read power is applied to the recorded area of the optical disk, the reading time parameter decision unit decides the amplification factors for the first balance adjustment part, the second balance adjustment part and the amplification part at the reading time as the recorded area parameters, decides a recorded area amplification factor of the first balance adjustment part at the reading time as an unrecorded area amplification factor of the first balance adjustment part at the reading time, decides an unrecorded area amplification factor of the second balance adjustment part at the reading time so that the amplitude of the output of the second balance adjustment part at the reading time is at the preset second level when the amplification factor of the first balance adjustment part at the reading time is set to the recorded area amplification factor multiplied by a preset second ratio, and decides an unrecorded area amplification factor of the amplification part at the reading time so that the amplitude of the generated tracking error signal is at the preset third level when the amplification factor of the first balance adjustment part at the reading time is set to the recorded area amplification factor multiplied by the preset second ratio and the amplification factor of the second balance adjustment part at the reading time is set to the unrecorded area amplification factor.

4. The optical disk apparatus according to claim 2, wherein:
   the reading time parameters include recorded area parameters for a recorded area of the optical disk and unrecorded area parameters for an unrecorded area of the optical disk,
   the parameter setting unit sets the recorded area parameters when the laser light of the read power is applied to the recorded area of the optical disk, and sets the unrecorded area parameters when the laser light of the read power is applied to the unrecorded area of the optical disk,
   if the laser light of the read power is applied to the unrecorded area of the optical disk, the reading time parameter decision unit decides the amplification factors for the first balance adjustment part, the second balance adjustment part and the amplification part at the recording time as the unrecorded area parameters, decides an unrecorded area amplification factor of the first balance adjustment part at the reading time as a recorded area amplification factor of the first balance adjustment part at the reading time, decides a recorded area amplification factor of the second balance adjustment part at the reading time so that the amplitude of the output of the second balance adjustment part at the reading time is at the preset second level when the amplification factor of the first balance adjustment part at the reading time is set to the unrecorded area amplification factor multiplied by a preset third ratio, and decides a recorded area amplification factor of the amplification part so that the amplitude of the generated tracking error signal is at the preset third level when the amplification factor of the first balance adjustment part at the reading time is set to the unrecorded area amplification factor multiplied by the preset third ratio and the amplification factor of the second balance adjustment part at the reading time is set to the recorded area amplification factor.

5. The optical disk apparatus according to claim 2, wherein the reading time parameter decision unit decides the reading time parameters when power of the main body is turned on or when the optical disk is set on the main body.

6. The optical disk apparatus according to claim 2, wherein the recording time parameter decision unit decides the recording time parameters when the reading time parameter decision unit decides the reading time parameters or when the recording/reading unit starts to record data on the optical disk.

7. The optical disk apparatus according to claim 2, further comprising:
   a disk type detection a unit for detecting the type of the optical disk set on the main body, and
   a prohibition unit for prohibiting the recording time parameter decision unit from deciding the recording time parameters when the disk type detection unit detects that the optical disk set on the main body is a read-only disk.

* * * * *